United States Patent
Miecznik

(10) Patent No.: US 7,273,558 B2
(45) Date of Patent: Sep. 25, 2007

(54) METHOD AND DEVICE FOR REDUCING SCALE FORMATION AND/OR CORROSION IN SYSTEMS WHICH CONDUCT LIQUIDS

(75) Inventor: Bert Miecznik, Elztal-Auerbach (DE)

(73) Assignee: Honeywell Technologies SARL, Morges (CH)

( * ) Notice: Subject to any disclaimer, the term of this patent is extended or adjusted under 35 U.S.C. 154(b) by 791 days.

(21) Appl. No.: 10/257,952

(22) PCT Filed: Feb. 22, 2001

(86) PCT No.: PCT/EP01/02007

§ 371 (c)(1),
(2), (4) Date: Oct. 24, 2002

(87) PCT Pub. No.: WO01/85620

PCT Pub. Date: Nov. 15, 2001

(65) Prior Publication Data

US 2003/0075509 A1 Apr. 24, 2003

(51) Int. Cl.
C02F 5/08 (2006.01)
(52) U.S. Cl. ............ 210/696; 210/652; 210/668; 210/687; 422/14
(58) Field of Classification Search ........ 210/696–701, 210/687, 663, 668; 422/12–14
See application file for complete search history.

(56) References Cited

U.S. PATENT DOCUMENTS

| | | | | |
|---|---|---|---|---|
| 2,807,807 A | * | 10/1957 | Harper | 4/227.1 |
| 3,649,532 A | * | 3/1972 | McLean | 210/718 |
| 4,029,576 A | * | 6/1977 | Shivers | 210/667 |
| 4,253,950 A | * | 3/1981 | Wojtowicz | 210/696 |
| 4,383,924 A | | 5/1983 | Ritter | 210/662 |
| 4,451,361 A | * | 5/1984 | Paterson | 210/136 |
| 4,931,187 A | | 6/1990 | Derham et al. | 210/662 |
| 5,156,746 A | * | 10/1992 | Maree et al. | 210/712 |
| 5,277,823 A | * | 1/1994 | Hann et al. | 210/696 |
| 5,837,134 A | * | 11/1998 | Heskett | 210/175 |
| 5,993,737 A | * | 11/1999 | Mackintosh et al. | 422/14 |

FOREIGN PATENT DOCUMENTS

| | | |
|---|---|---|
| DE | 1 955 571 | 5/1971 |
| DE | 38 12 413 A1 | 10/1989 |
| DE | 40 15 336 A1 | 11/1991 |
| GB | 2 013 171 | 8/1979 |

* cited by examiner

Primary Examiner—Peter A. Hruskoci
(74) Attorney, Agent, or Firm—Hoffman, Wasson & Gitler

(57) ABSTRACT

The invention relates to a method and a device for reducing scale formation and/or corrosion in systems which conduct liquids or are in contact with liquids. According to the invention, this is achieved without reducing the quantity of hardness constituents contained in the liquid overall, without exchanging the hardness constituents in the liquid for other cations such as e.g. hydronium, sodium or potassium and without adding chemicals such as e.g. phosphates which inhibit scale formation to the liquid. Instead, scale formation is reduced by specifically shifting the molar distribution of the hardness constituents, especially the distribution proportions of the individual hardness constituents magnesium and calcium strontium and barium. According to the inventive method, proportions of the hardness constituents calcium, strontium and barium in the liquid are substituted with the proportions of the hardness constituent magnesium, In addition to efficiently reducing scale formation, the method inhibits corrosion processes in systems which conduct liquids or are in contact with liquids and reduces the extent of these processes.

9 Claims, 7 Drawing Sheets

METHOD AND DEVICE FOR REDUCING SCALE FORMATION AND/OR CORROSION IN SYSTEMS WHICH CONDUCT LIQUIDS

BACKGROUND OF THE INVENTION

This invention relates to a method for reducing scale formation and/or corrosion in systems conveying or in contact with liquids. The invention further concerns a device for inhibiting scale formation and/or corrosion in such systems.

It has long been known from the prior art that deposits and crusts are separated out from liquids especially if the liquids contain hardening salts of elements (magnesium, calcium, strontium, barium) from the group of alkaline earth metals. The best known and technically most significant example for the formation of deposits from liquids is limestone formation from the drinking water medium, whereby carbonate and other salts of the alkaline earth metal calcium are deposited, especially if the water is heated. These deposits, which may also contain other coprecipitated substances, are largely insoluble relative to the medium of drinking water, and in unfavourable cases can lead to formation of encrustation including blocking of liquid-conducting systems (e.g. pipes, water heaters, boilers), as well as to formation of undesired visible traces of sediment in liquid-based systems (e.g. wash basins, shower separations). The common term for the occurrence of these effects is "calcification" and often equates drinking water, which has substantial portions of hardening constituents—so-called hard water—with qualitatively poor water, despite the fact that portions of hardening constituents in drinking water count as mineral substances most welcome in another connection, which are significant not only for nourishment, but which are also said to have taste-ameliorating properties.

To counteract the risk of scale formation a large number of methods has been proposed over time. In particular, methods for material removal of the hardening constituents or the corresponding carbonate anions from liquids are to be mentioned, for which there are various portions available, e.g. mechanical softening via membranes, exchange of hardening constituents for other ions. Distillation and on the largest scale also precipitation, flocculation and filtration. Alongside these there are methods which combat the risk of deposits by metered addition of various substances for inhibiting or masking hardening constituents, examples of which would be dosing of polyphosphates, dosing of zeolites or dosing of aminopolycarbonic acids such as NTA or EDTA. The palette of available methods is supplemented by methods which focus not on the cations of the hardening constituents themselves, but rather on the carbonate anions required for scale formation, again with the variants of removing or inhibiting carbonate anions. In recent times certain methods have gained prominence which are supposed to curtail the occurrence or growth of calcareous deposits by introducing so-called seed crystals or crystal nuclei to water, whereby part of these methods is based on manufacturing the seed crystals or crystal nuclei during treatment from the present contents previously dissolved in water. To assess whether such methods are actually capable of reducing scale formation, various mostly empirical testing methods have been described, of which greater significance can only be imputed from the DVGW worksheet W512.

For the purpose of corrosion protection there are also various methods available which can be divided into filtering methods, which lower the risk of formation of local corrosion cells by means of removing particular water contents, as well as methods characterised by the metered addition of corrosion-inhibiting chemicals, e.g. orthophosphate, aluminium, magnesium, zinc, where an electrochemical potential opposing the corrosion potential is utilised partially during dissolution (passive sacrificial anodes, or active cathodic corrosion protection).

Finally there are methods known which focus on corrosion protection by setting equilibrium conditions or lime-separating conditions according to the lime-carbonic acid equilibrium, for which either the acid content of the liquid is reduced, or the content of the liquid is increased in acid binding capacity and therefore also in hardening constituents ("marble filtration").

The situation for examining hardening constituents and the corresponding mostly carbonate anions arises where these can cause the formation of deposits in relative excess, whereas on the other side a relative lack of hardening constituents and of corresponding mostly carbonate anions can accelerate corrosion processes. This correlation is described by way of the so-called lime-carbonic acid equilibrium, which shows on closer inspection that there exists between both extremes of scale formation and corrosion a state of equilibrium, in which a liquid has a tendency neither to scale formation nor to corrosivity.

But this state of equilibrium becomes unstable if the liquid, for example drinking water, undergoes fluctuations in temperature. Thus during warming the lime-carbonic acid equilibrium shifts from the neutral state to the scale formation state, which lasts until the water returns to equilibrium via separation of the now excess hardening constituents. If this water depleted of hardening constituents is cooled again, then corrosivity may occur.

In their operation all the abovementioned methods focus either exclusively on the aspect of diminishing scale formation or exclusively on the aspect of corrosion protection. Often for practical use a method focussing on one aspect has to be supplemented by a second method which takes into account every other aspect.

Reference is made to DE-A-28 00 516, DE-A-19 55 571 and DE-A-38 12 413 in terms of documented art.

Based on this, the task of the invention is to create an improved method for inhibiting scale formation and/or corrosion in systems conveying or in contact with liquids, as well as a corresponding device.

SUMMARY OF THE INVENTION

By modifying the molar distribution of the hardening constituents, the invention makes use of near-natural effects which integrally link both the aspects of reducing scale formation and reducing corrosion and consequently result in simultaneous protection from scale formation and corrosion, without by and large altering the content of hardening constituents in the process and without relying on metering other substances.

The invention is based on the knowledge that a liquid such as drinking water for example—also when it is heated—has a less rock-forming effect if it has greater proportions of magnesium of over 20% to 100% of the overall content of hardening constituents in the natural composition of the hardening constituents dissolved in it. The aim of the invention is to make available the natural protective effect of higher magnesium portions in the overall hardness also for those liquids which do not have naturally occurring higher magnesium portions in the overall hardness, and provides for substituting portions of the other hardening constituents for portions of magnesium.

The same observation of diminished scale formation applies if the liquid does not avail itself of a high natural magnesium hardness, but was brought into contact with dolomite or other magnesium-containing rocks or minerals such as magnesium chloride or magnesium chloride hexahydrate, for example during treating of drinking water for the purpose of hardening. Other than in the abovementioned processes, which focus primarily on boosting the content of hardening constituents, the invention makes use of the effect of higher magnesium portions on the overall hardness protecting from scale formation as a focussed main effect, without unavoidably increasing the hardness of the liquid. Also, with the abovementioned processes there is no reduction in those portions of the overall hardness, not comprising magnesium, since this does not generally result in substitution of already dissolved hardening constituents for the additionally offered magnesium portions and additional magnesium content is added additively only. The invention includes basically all applications in which portions not comprising magnesium in the overall hardness are substituted for portions of magnesium.

The invention effectively reduces scale formation. Therefore, with optional cooling of the liquid undertaken after heating those hardening constituents and their corresponding, mostly carbonate anions are further available as corrosion protection, which would otherwise have lead to relative depletion of the liquid of hardening constituents due to their being removed via scale formation.

In addition to this higher magnesium portions in a liquid also have other positive effects with respect to a decline in corrosion. Top layer formation (protective layer formation) thus takes place with hydroxide deposits of magnesium as hardening constituents more effectively and more fine crystal and thus "more densely" than for example with calcium. This positive effect is also guaranteed by the invention, so that a corrosion protection effect results from the invention to the extent that both double passive protection (protective layer formation, availability of hardening constituents after cooling of heated liquids) and optionally active protection via steric and complex chemical effects arises.

BRIEF DESCRIPTION OF THE DRAWINGS

Preferred embodiments are described hereinbelow with reference to following figures.

DETAILED DESCRIPTION OF THE INVENTION

Various equipment can be utilised to carry out the inventive substitution of other hardening constituents for the hardening constituent magnesium.

Figure 1:
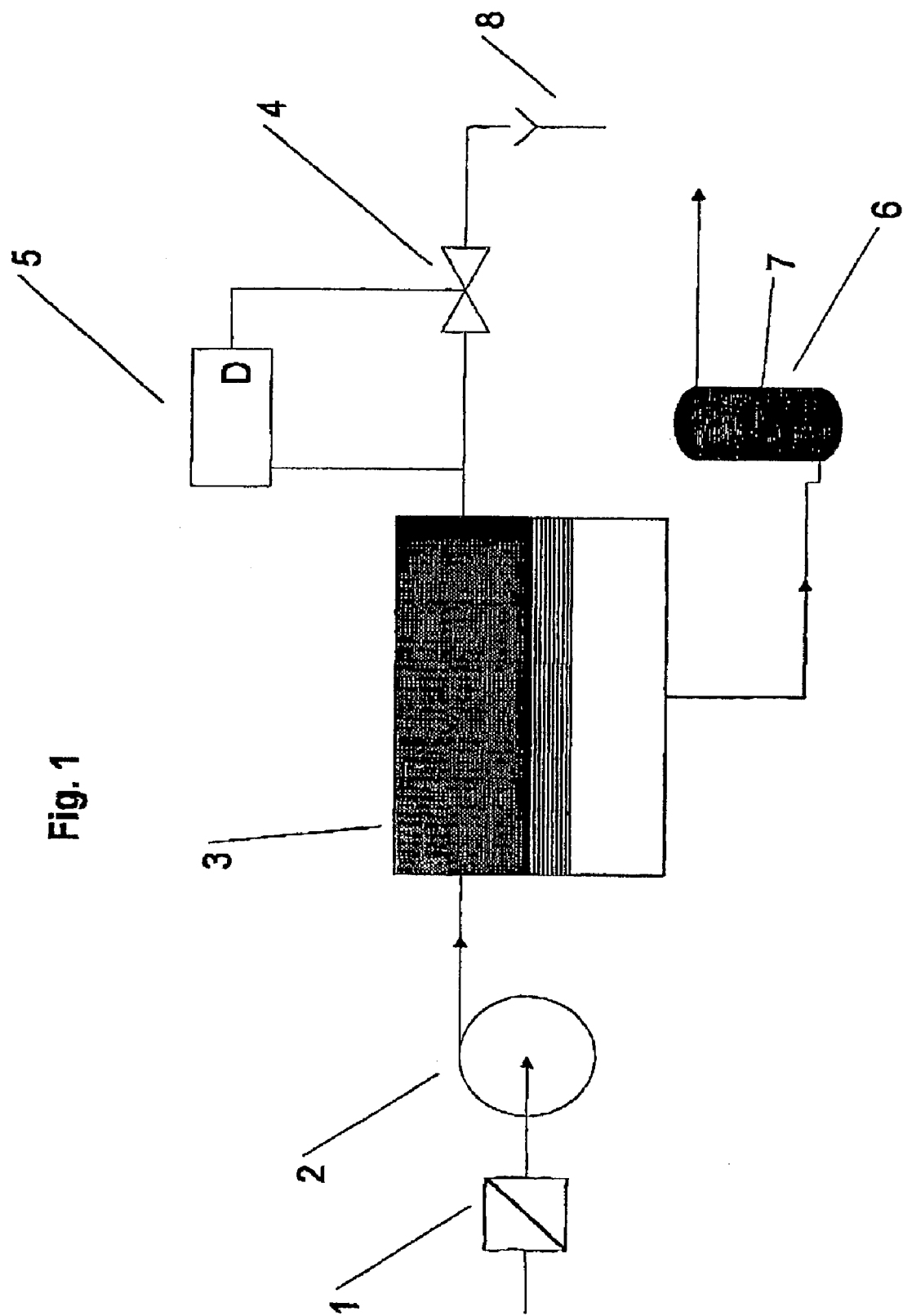
FIG. 1 illustrates the method according to the present invention according to a first embodiment of the invention.

Substitution according to the present invention can take place as per FIG. 1, for example. According to FIG. 1 a membrane process is followed by a hardening process. FIG. 1 shows that the liquid to be treated passes through a filter and a pump 2 and is then conveyed to a membrane unit 3, in which the membrane process takes place. The membrane process is a mechanical softening by means of e.g. reverse osmosis or nanofiltration. Thereafter the liquid flows into a hardening unit 6 operating on dolomite or other magnesium-containing rocks or minerals such as magnesium chloride or magnesium chloride hexahydrate 7. As evident from FIG. 1 the treated liquid exits the hardening unit 6. The function and operation of the remaining illustrated assemblies such as pressure control 5, control valve 4 and discharge 8 are known to the expert and require no further detailed description.

Figure 2:
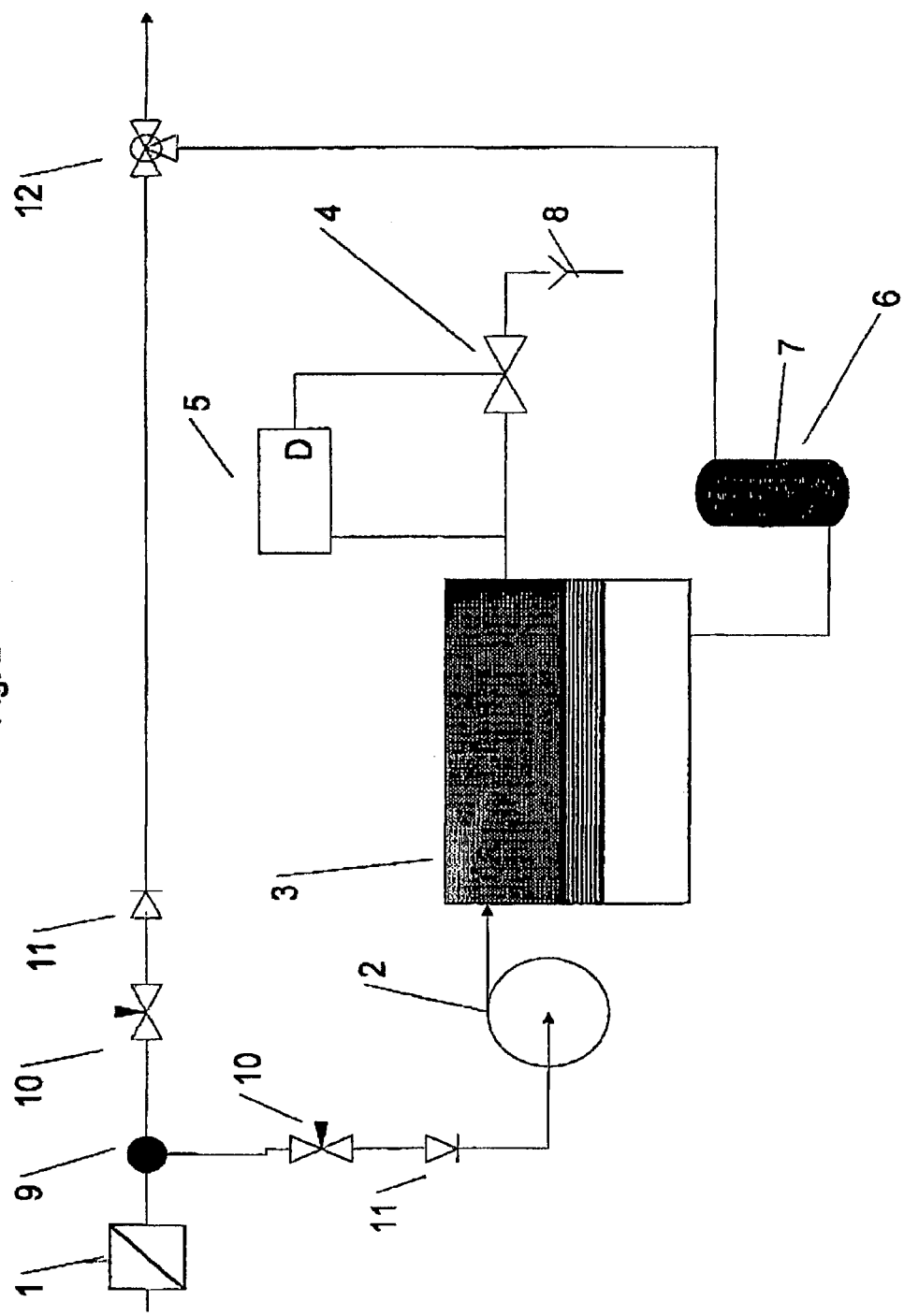
FIG. 2 illustrates the method according to the present invention according to a second embodiment of the invention.

According to FIG. 2 the corresponding treatment according to FIG. 1 can also be restricted to a partial flow of liquid which is then reunited with the main flow. This brings about the added option of defining the magnesium contents in the main flow more precisely by regulating the flow ratios. The partial flows are branched at the distribution fitting 9, while the treated partial flow unites with the untreated main flow at the mixing valve 12 of FIG. 2. Treating a partial flow only proves to be particularly advantageous. It is known from the invention is that treating a partial flow is also sufficient to achieve effective reduction of scale formation and/or corrosion. The effect here is surprising because when treating a partial flow only the expert would expect a reduction of scale formation only to the extent where a treated partial flow is involved. In other words, the expert would expect reduction in scale formation by 50% if the partial flow and the main flow made up 50% respectively. But in treating a partial flow only the surprising effect of this was that resulted in an almost unreduced reduction of scale formation and/or corrosion even with treating a partial flow only. The desired efficacy accordingly remains intact with treating a partial flow only. The partial flow should make up maximum 50% of the total flow. Efficacy accordingly remains almost unchanged if the partial flow to be treated makes up between 50% and 100% and the untreated main flow makes up between 50% and 0%.

A possible example consequently is: 70% partial flow to be treated; 30% untreated main flow.

Figure 3:
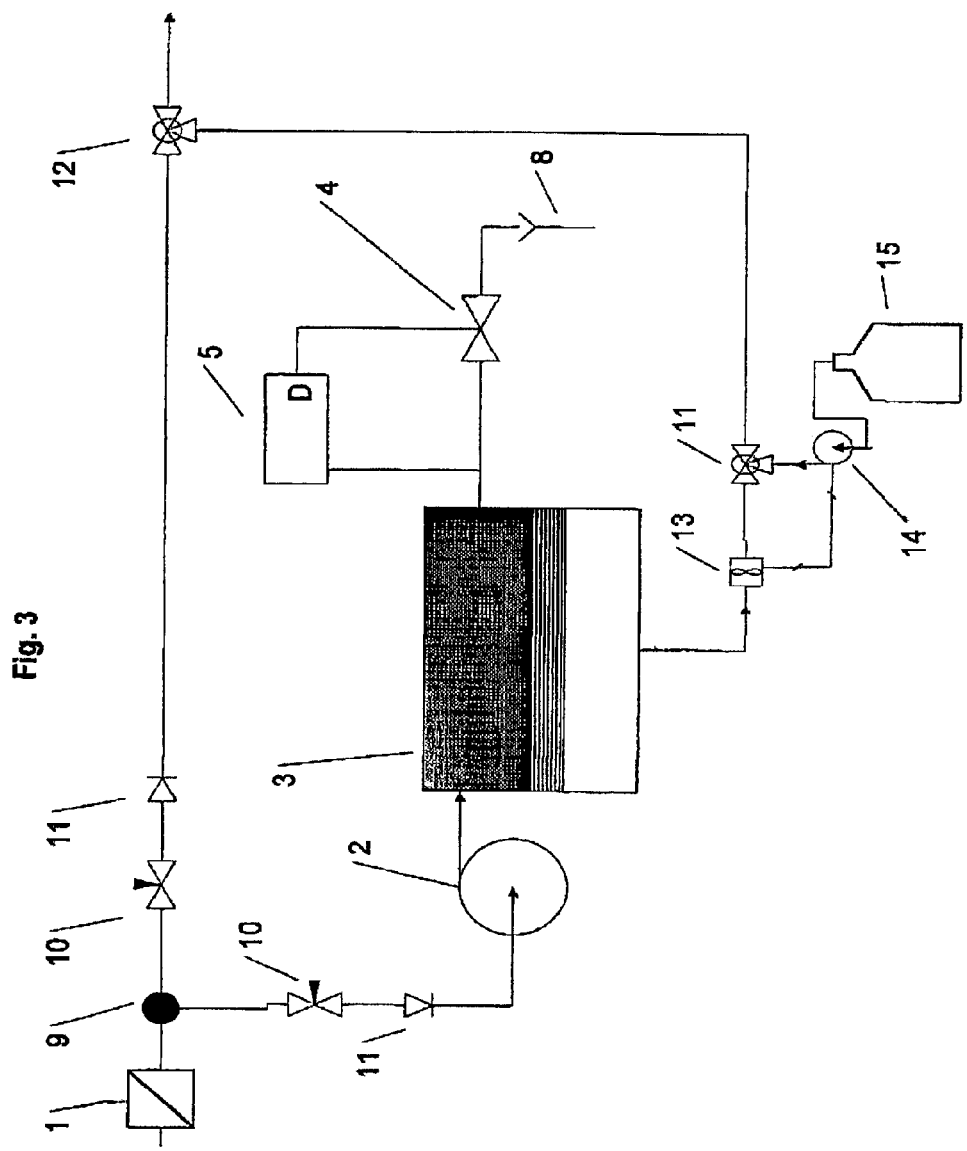
FIG. 3 illustrates the method according to the present invention according to a third embodiment of the invention.

According to FIG. 3 the hardening unit downstream of the mechanical softening can also, according to FIG. 1 or FIG. 2, be arranged via proportional dosing of a concentrated solution of a magnesium salt such as for example a magnesium chloride solution. The magnesium chloride solution is stored in a reservoir 15 and is added proportionally using the assembly of throughflow meter 13, dosing pump 14 and return valve 11. Here there is also the option of using existing and installed dosing systems and thus the possibility of reallocating these systems to the method according to the present invention. For this the dosing systems must be readjusted either by intrusions in control on the discharge of suitable quantities of magnesium salts, or the solution of the used magnesium salt must be adjusted in its concentration such that appropriate quantities are discharged. By keeping to the existing regulating system the dosing device can also be retrofitted by the customer such that a suitable quantity is discharged via an alteration at the pump (e.g. pump head, e.g. lumen in peristaltic pumps). Here it is also possible to manipulate the metering mechanism of the dosing system to determine the current throughflow via an additional module such that the system detects an at least proportional, virtual throughflow instead of the current throughflow and takes on the dosing in such a quantity, as would correspond to the virtual throughflow and indeed in the ratio that the necessary dosing quantity for the current throughflow is reached.

Figure 4:
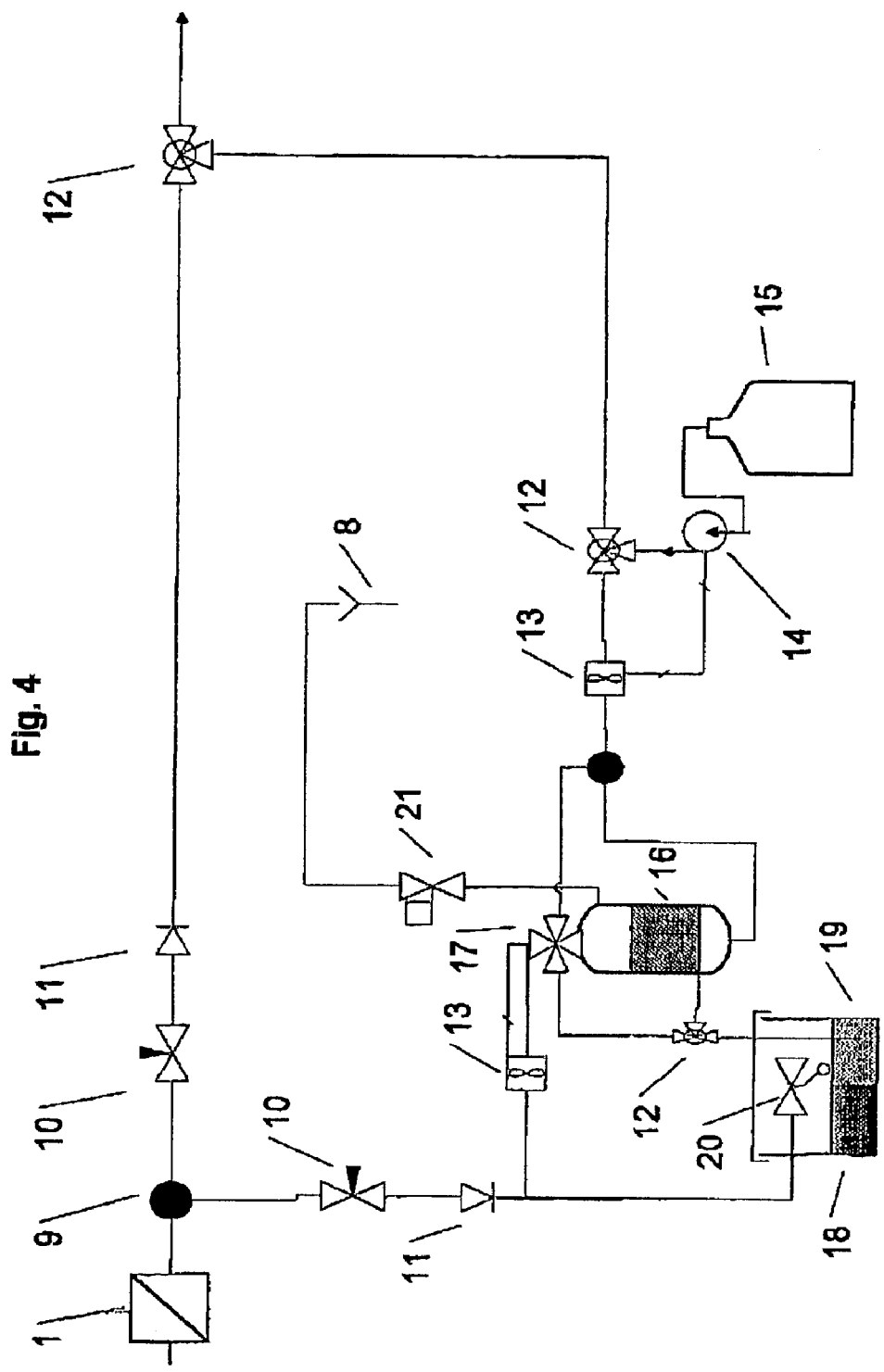
FIG. 4 illustrates the method according to the present invention according to a fourth embodiment of the invention.

According to FIG. 4 it is also feasible to carry out mechanical softening by way of softening via an ion exchanger 16 in exchange for other cations such as sodium or potassium, whereby proportional dosing of a concentrated solution of a magnesium salt, such as for example a magnesium chloride solution, is placed downstream of the softening unit with the aid of assemblies 12, 13, 14 and 15. With correct dosing due to this arrangement the hardness of the liquid does not increase, and on principle an increase in salinity is unavoidable, so that use of the device shown at 4 has to be limited to cases where an increase of the total salt content of the liquid is not critical. As shown, treating a partial flow is also possible in this case.

Figure 5:
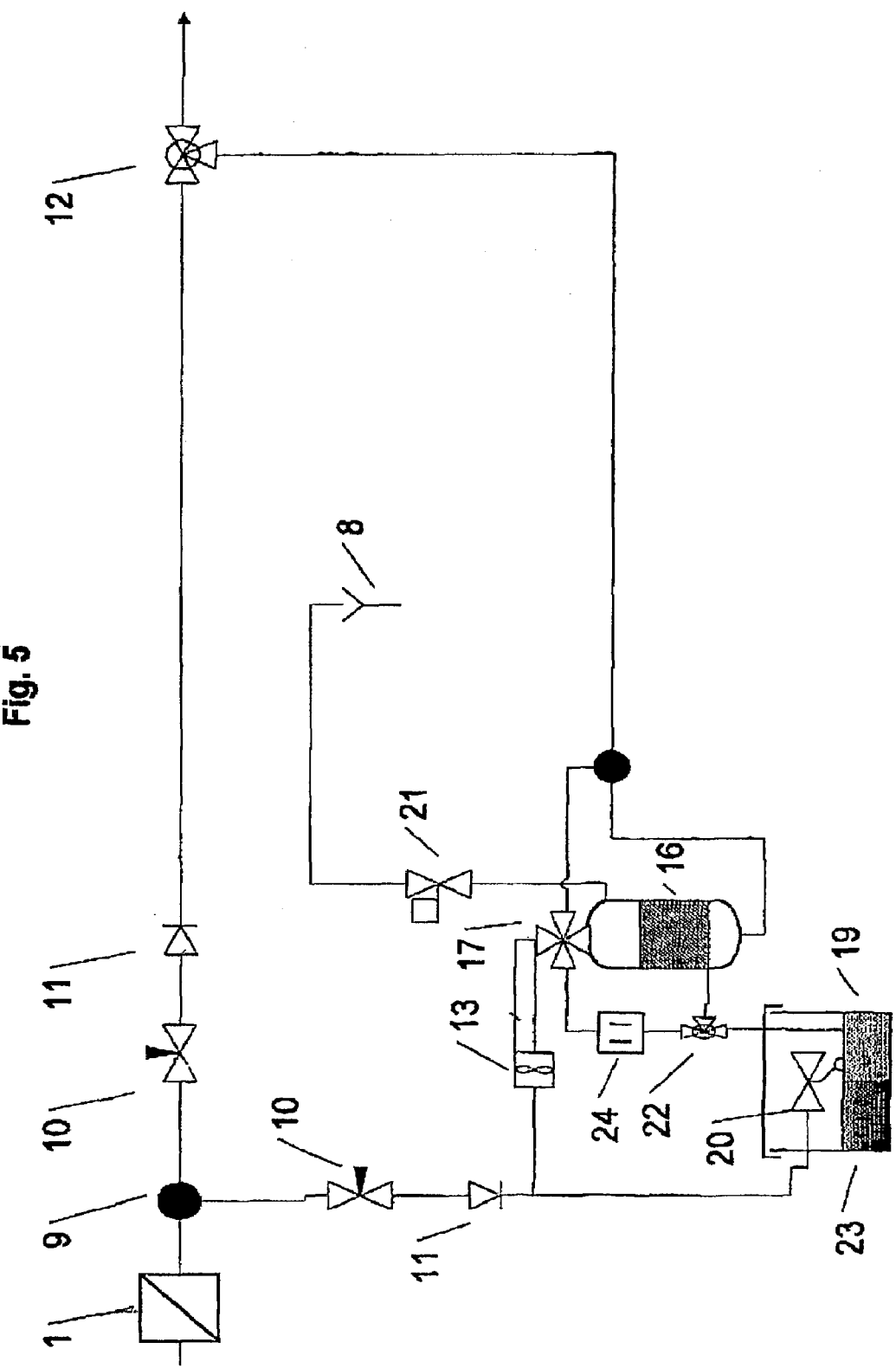
FIG. 5 illustrates the method according to the present invention according to a fifth embodiment of the invention.

According to FIG. 5 it is also possible to integrate treating the liquid with the partial steps of removing other hardening constituents and adding magnesium in a single device and thereby likewise exclude any increase in salinity. Here for example a strongly acidic cation exchanger 16 charged with magnesium ions can be used, which binds portions of other hardening constituents due to their higher molar weight more specifically as magnesium during the operating phase and substitutes the other hardening constituent for magnesium, and which during regular regeneration phases is charged with concentrated solutions of magnesium salts such as for example magnesium chloride and is thus regenerated. The device can also be designed such that two or more cation exchanger modules are put to use with operating and regeneration phases parallel or offset to one another, so that in the overall system continuous supply with treated water is ensured. The device must be fitted with a control unit 17, which triggers regeneration procedures dependent on either time or throughflow. A flow meter 13 is provided for throughflow-dependent triggering. To keep the magnesium chloride brine ready the device is fitted with a magnesium chloride dissolving tank 19 as well as a reservoir 23 for storing additional magnesium chloride, thus enabling a substantially unsupervised mode of operation. The device also has a rinsing mechanism for rinsing out any residual magnesium chloride brine on completion of regeneration. The device is optionally equipped with an electrolytic disinfection unit 24 for producing disinfecting chlorine or hypochlorite from magnesium chloride brine during regeneration. The device is also fitted with a diluting valve 17, so that the magnesium portion in the treated liquid can be adjusted in order to meet possibly present standard magnesium or limit values, for example for drinking water, where these are locally required. The currently valid German drinking water order for example provides a standard value for magnesium of 50 mg/l, or 120 mg/l, if the magnesium content is counter-stipulated. Depending on the magnesium content on the input side up to 2.08 mmol/l of other hardening constituents can be removed and substituted by magnesium. Taking the higher standard value as a basis removal can be elevated to even 5 mmol/l or 28° dH. It should be noted that both standard values are caused neither toxicologically nor technically, but are utilised primarily as process control parameters for water supply concerns. If both standard values being exceeded by the device were to have no negative effects on health or the domestic technique, then adhering to legal requisites should be nonetheless prevented. Magnesium chloride is permitted by the German drinking water order as an additive to the preparation of drinking water.

Figure 6:
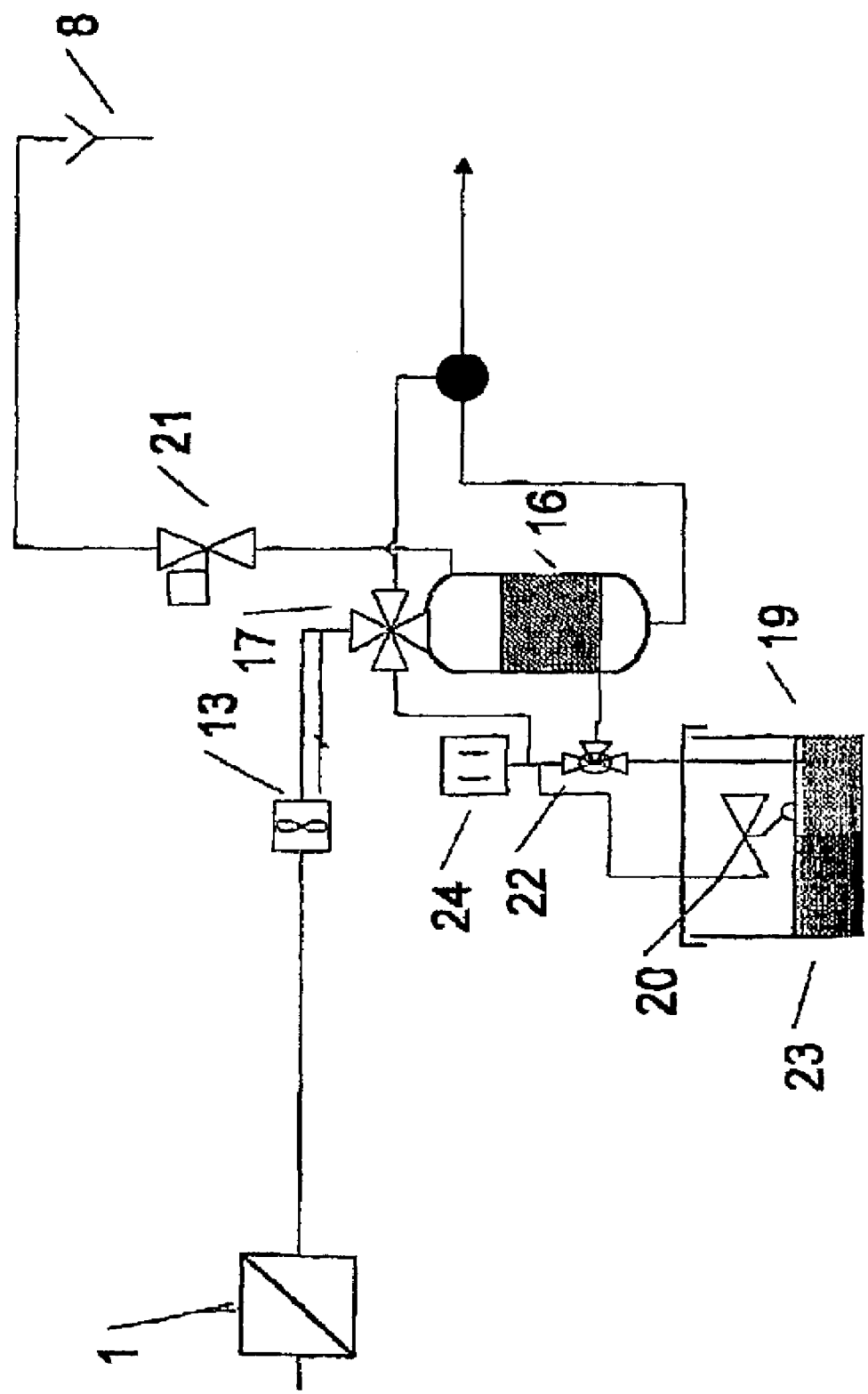
FIG. 6 illustrates the method according to the present invention according to another embodiment of the invention.

As shown in FIG. 6 instead of a strongly acidic also a weakly acidic cation exchanger 16 differing from the device in FIG. 5 can be used, in both cases also without there having to be any restriction placed on treating a partial flow. Technical limiting of the exchange to the equivalent of carbonate hardness as in weakly acidic exchangers regenerated with sodium chloride does not occur here, because the overall hardness in the liquid is left unchanged by the device. The remaining components of the device are as in FIG. 5, apart from the cation exchanger.

Devices as per FIG. 5 and FIG. 6 can be regenerated clearly more favourably, as compared to known cation exchangers which are regenerated with sodium chloride or acid at otherwise identical throughflow capacity. The chief reason for this is that due to the far more similar selectivity between magnesium and the other hardening constituents, as compared to the far greater selectivity differences between monovalent ions and divalent alkali earths, there is a clearly flattened breakdown curve. Therefore the loss of regenerating agents, which is caused by the compulsion to generate clearly greater concentration differences in the case of monovalent regenerating agents, can be clearly limited. The device is thus considerably more favourable with respect to the efficacy of the regeneration agents used, which can result in a substantial approach to stoichiometric salt consumption values. In order to utilise this advantage, as shown in FIGS. 5 and 6 mixer valves 22 are provided, with which the magnesium chloride brine can clearly be diluted for regeneration with liquid. Because comparatively only minimal concentrations are required here, and the solubility of magnesium chloride in brine is clearly elevated relative to sodium chloride, the mixer valve can also be designed as a static Venturi nozzle, has a fixed mixing ratio with a clearly predominant volume flow of the pressured liquid side relative to the volume flow of the aspirated brine and requires no further regulating. The control valve 17 cooperates with the mixing valve 22 for the regeneration effect. Should the cation exchanger 16 be regenerated then the partial flow is guided not from top to bottom through the cation exchanger 16, but is mixed with brine taken from a reservoir 19 at the mixing valve 22 in a first step and in a second step is guided from bottom to top, therefore in a countercurrent, through the cation exchanger 16 and finally conveyed to the discharge 8. On completion of regeneration it is then reversed at the control valve.

The clearly flattened breakdown curve leads to the fact that during normal operation portions of other hardening constituents constantly remain in the liquid and breakdown of the other hardening constituents happens very slowly and continuously. Based on the effective principle of raising the magnesium content treatment is, however, still successful until breakdown approaches complete exhaustion of the exchange capacity. This enables prolonged service life, or compared to the molar exchange capacity of a cation exchanger regenerated with sodium chloride or acid, a larger volume of treated liquid, until the next regeneration must occur. This is especially useful for treating liquids other than drinking water. Regeneration should be carried out independently of the actual throughflow, especially for treating drinking water, for reasons of hygienic inherent safety of the device at the latest every 4 days.

For devices as in FIG. 5 or 6 existing, already installed cation exchangers can also be reallocated for the method according to the present invention. For this the systems must be equipped such that an effective, economical mode of operation is ensured, optimised for environmental repercussions. This reallocation can be implemented by customers by substituting the filled-in exchange resin for a resin having more favourable properties (selectivity) for operation and regeneration with magnesium salts. Another possibility is the substitution of the existing control valve set for the associated screens and throttles by valve sets with associated screens and throttles, which result in economical operating and regeneration conditions. This is achieved in particular by retrofitting screens or throttles which choke the volume flow of brine during regeneration mode and/or by measures (e.g. Venturi nozzle), which restrict the consumption of brine during regeneration by dilution or increased dilution with liquid (e.g. water).

Reallocation of existing apparatus to the method according to the present invention can also be carried out alternatively or in addition by modifying control engineering (e.g. software). For this changes must be made on the control stroke or in the sequence of the individual flow phases during regeneration or during the respective duration of same. The changes can also be undertaken on the preset operating parameters (monitoring function for triggering regeneration) such that operating and regeneration conditions are achieved which are optimised for using magnesium salts as regeneration agents.

Figure 7:
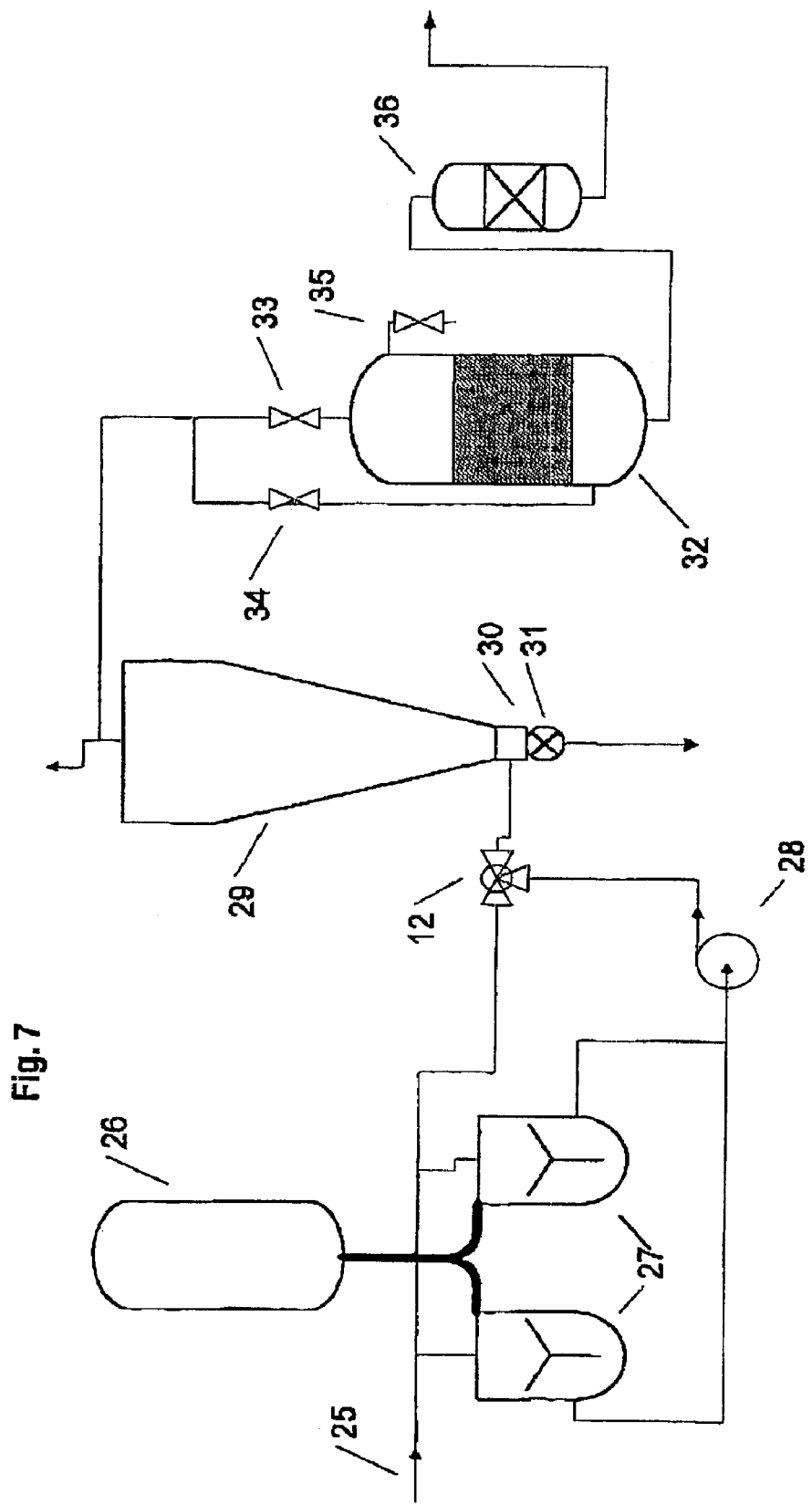
FIG. 7 illustrates the method according to the present invention according to a embodiment of the invention on an industrial scale.

According to FIG. 7 it is also possible for industrial-scale applications in particular to implement the method in fast or slow decarbonising plants. FIG. 7 demonstrates how the liquid is mixed in a mixing valve 12 with a suspension of suspended, burnt dolomite (MgO/CaO) or a suspension of a suspended mixture of burnt dolomite and burnt lime. By using magnesium-containing burnt dolomite, and in particular via the basic reaction of magnesium oxide, it is possible to decarbonise the liquid in rapid decarbonising to above equilibrium and thus also to soften it. For manufacturing the suspension a dolomite silo 26 is provided which charges one or more agitator reservoirs 27 with the burnt dolomite or a mixture of burnt dolomite and burnt lime; from the agitator reservoirs the suspension is added to the main flow via a metering pump 28. On completion of mixing the suspension-laden main flow is fed via an injection zone 30 to a reactor 29 and remains there during a reaction time of 10 to 20 minutes, during which the hardening constituents precipitate. For discharging the precipitated hardening constituent particle mass the reactor is provided with a continuous emptying device 31, for which a cell wheel sluice is used, for example. After it leaves the reactor the ventilated liquid is sent for further separating of non-sediment particles to a quick sand filter 32. The quick sand filter is equipped for regular rinsing out of discharged particles with a reversible flow device 33, 34 and 35. The liquid is then sent to a neutralising filter 36 with an unburnt dolomite filling, in which by dissolving the dolomite there is final raising of the magnesium content and adjusting the liquid to the lime-carbonic acid equilibrium. The neutralising filter can also be integrated into the quick sand filter, if the latter is filled with a neutralising dolomite layer underneath the sand layer and is operated as a multi-layer filter.

FIG. 1 permeate treated liquid
1. filter
2. pump
3. membrane unit
4. control valve
5. pressure control
6. neutralising filter
7. filling with $MgCl_2$
8. discharge

FIG. 2 permeate treated liquid
1. filter
2. pump
3. membrane unit
4. control valve
5. pressure control
6. neutralising filter
7. filling with $MgCl_2$
8. discharge
9. distribution fitting
10. stop valve
11. return valve
12. mixing valve

FIG. 3 permeate treated liquid
1. filter
2. pump
3. membrane unit
4. control valve
5. pressure control
8. discharge
9. distribution fitting
10. stop valve
11. return valve
12. mixing valve
13. flow meter
14. metering pump
15. $MgCl_2$ solution tank

FIG. 4 treated liquid
1. filter
8. discharge
9. distribution fitting
10. stop valve
11. return valve
12. mixing valve
13. flow meter
14. metering pump
15. $MgCl_2$ solution tank
16. cation exchanger
17. control head
18. NaCl salt tank
19. dissolving tank
20. refill fitting
21. regeneration valve

FIG. 5 treated liquid
1. filter
8. discharge
9. distribution fitting
10. stop valve
11. return valve
12. mixing valve
13. flow meter
16. cation exchanger
17. control head
19. dissolving tank
20. refill fitting
21. regeneration valve
22. Venturi nozzle
23. MgCl$_2$ tank
24. electrolyte cell

FIG. 6 treated liquid
1. filter
8. discharge
9. distribution fitting
10. stop valve
11. return valve
12. mixing valve
13. flow meter
16. cation exchanger
17. control head
19. dissolving tank
20. refill fitting
21. regeneration valve
22. Venturi nozzle
23. MgCl$_2$ tank
24. electrolyte cell

FIG. 7 ventilation particle mass emptying
12. mixing valve
25. pressure feed
26. dolomite silo
27. agitator reservoir
28. suspension pump
29. reactor
30. injection zone 31. cell wheel sluice
32. quick sand filter
33. stop slide valve
34. reverse flow slide valve
35. sludge discharge
36. dolomite neutralising filter

What is claimed is:

1. A method for inhibiting scale formation and/or corrosion in systems conveying or in contact with liquids, whereby the liquid has a hardness and is treated such that the molar distribution of the hardening constituents in the liquid to be treated is influenced such that a proportion of magnesium and/or magnesium compounds is increased at the expense of the proportion of the other hardening constituents, wherein only a partial flow of the liquid is treated and then the treated partial flow is mixed with an untreated main flow.

2. The method as claimed in claim 1, wherein the partial flow is between 50% and 100% and the main flow is between 50% and 0% of the liquid to be treated.

3. The method as claimed in claim 1, wherein the molar distribution is influenced such that the proportion of magnesium and/or magnesium compounds is between 20% and 100% of the overall content of the hardening constituents.

4. The method as claimed in claim 3, wherein the partial flow to be treated is brought into contact with a magnesium-containing rock or mineral.

5. The method as claimed in claim 3, wherein a solution of a magnesium salt is added in proportional quantity to the liquid to be treated.

6. The method as claimed in claim 3, wherein to this end magnesium ions are added to the liquid to be treated in direct and equivalent exchange for other ions.

7. The method as claimed in claim 1, wherein the hardness of the liquid is not changed.

8. The method of claimed in claim 1, wherein the proportion of magnesium or magnesium compounds is increased by calcium, strontium and barium are substituted for the magnesium or magnesium compounds.

9. The method of claimed in claim 1, wherein the proportion of magnesium or magnesium compounds is increased at the expense of the proportion of the other hardening constituents by replacing the other hardening constituents.

* * * * *